Jan. 19, 1954   K. H. TENOORT   2,666,573
DIFFERENTIAL LATCH MECHANISM
Filed July 14, 1951   4 Sheets-Sheet 4
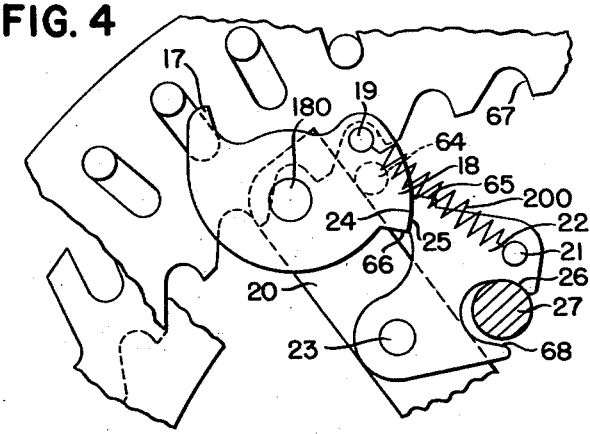
FIG. 4
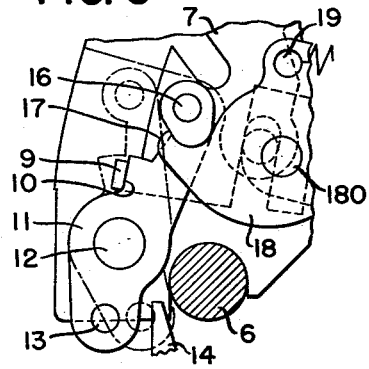
FIG. 5
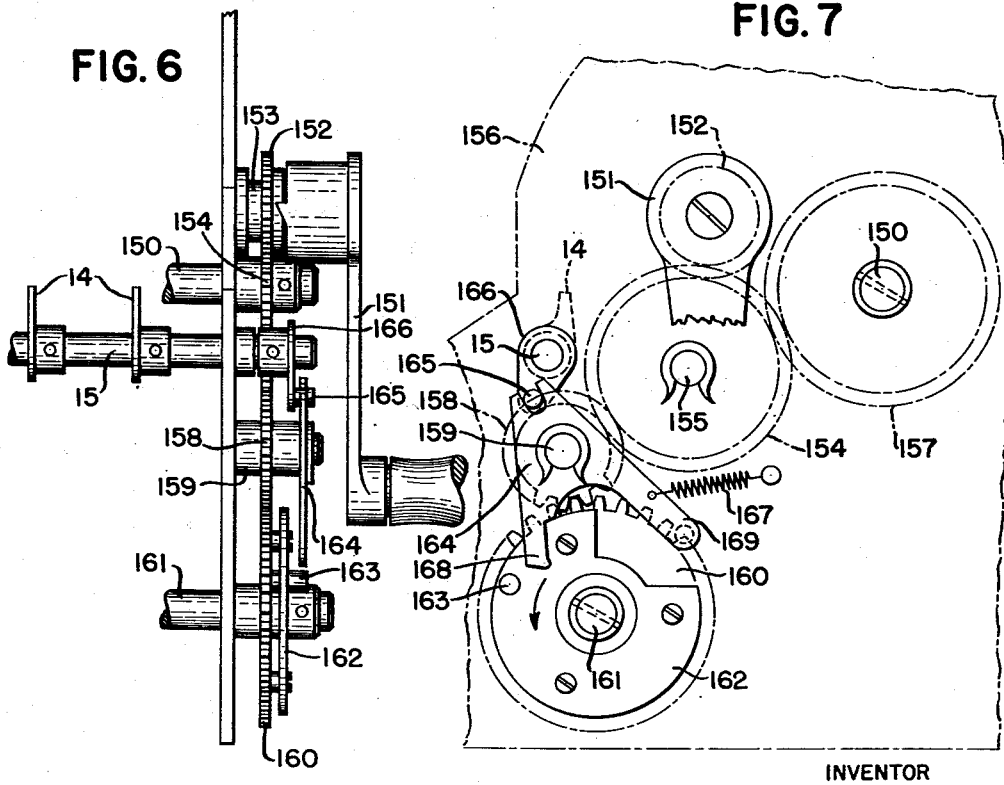
FIG. 6
FIG. 7
INVENTOR
KARL H. TENOORT
BY
HIS ATTORNEYS Patented Jan. 19, 1954

2,666,573

UNITED STATES PATENT OFFICE 2,666,573

DIFFERENTIAL LATCH MECHANISM

Karl Heinrich Tenoort, Berlin-Neukolln, Germany, assignor to The National Cash Register Company, Dayton, Ohio, a corporation of Maryland Application July 14, 1951, Serial No. 236,811

Claims priority, application Germany October 21, 1950

5 Claims. (Cl. 235—14)

This invention relates to improvements in differential latch mechanisms for cash registers and accounting machines and is illustrated as applied to a machine of the type shown in United States Patent No. 2,209,763, issued to Ernst Breitling on July 30, 1940.

The latch mechanism provides a means for converting the lever-set machine of said Breitling patent into a key-set machine.

This invention relates to differential mechanism for cash registers and similar accounting machines of the kind in which, for each denomination of a key bank, there is provided a differential arm carrying a latch, the arm being adapted to remain coupled to a driving mechanism until the latch is tripped under the control of an operated key or a zero stop, to effect the disconnection of the arm from the driving mechanism and retain it in the set position until restoration is effected.

The object of the invention is to provide a simple and reliable form of differential latch mechanism that is economical to manufacture.

Accordingly, the invention comprises differential mechanism for a cash register or similar accounting machine including item-entering keys; a differential arm for transmitting the setting of the keys to indicating, printing, and totalizing mechanisms; a driving mechanism for the differential arm; and a latch device normally coupling the arm to a driving mechanism and arranged to uncouple the differential arm from said driving mechanism when the former has been set under the control of an operated key or a zero stop, characterized in that the latch device includes a pair of interacting members both directly mounted on the differential arm, one of which normally locks the other in engagement with the driving mechanism, engagement of the first-mentioned member with an operated key, or zero stop, causing relative movement between the members to cause the second-mentioned member to be disconnected from the driving mechanism, and the latter member then locking the first-mentioned member in the position to which it has been adjusted under control of said operated key.

The invention will be described in detail, and, by way of example, as applied to a machine including a plurality of denominational banks of amount keys and related differential mechanisms, but, as these differential mechanisms are all identical, the description will be confined to only one of these mechanisms.

With the foregoing and incidental objects in view, the invention includes certain novel features of construction and combinations of parts, a preferred form or embodiment of which is hereinafter described with reference to the drawings which accompany and form a part of this specification.

Of said drawings,

Fig. 4 is an enlarged detail view of the latch in normal position, in respect to the differential arm, but shows the differential arm in an operated position.

Fig. 5 is a detail view of the zero stop in normal position.

Fig. 6 is a front elevational view showing the machine-operating mechanism.

Fig. 7 is a side elevational view of the mechanism shown in Fig. 6.

Detailed description

Figure 1:
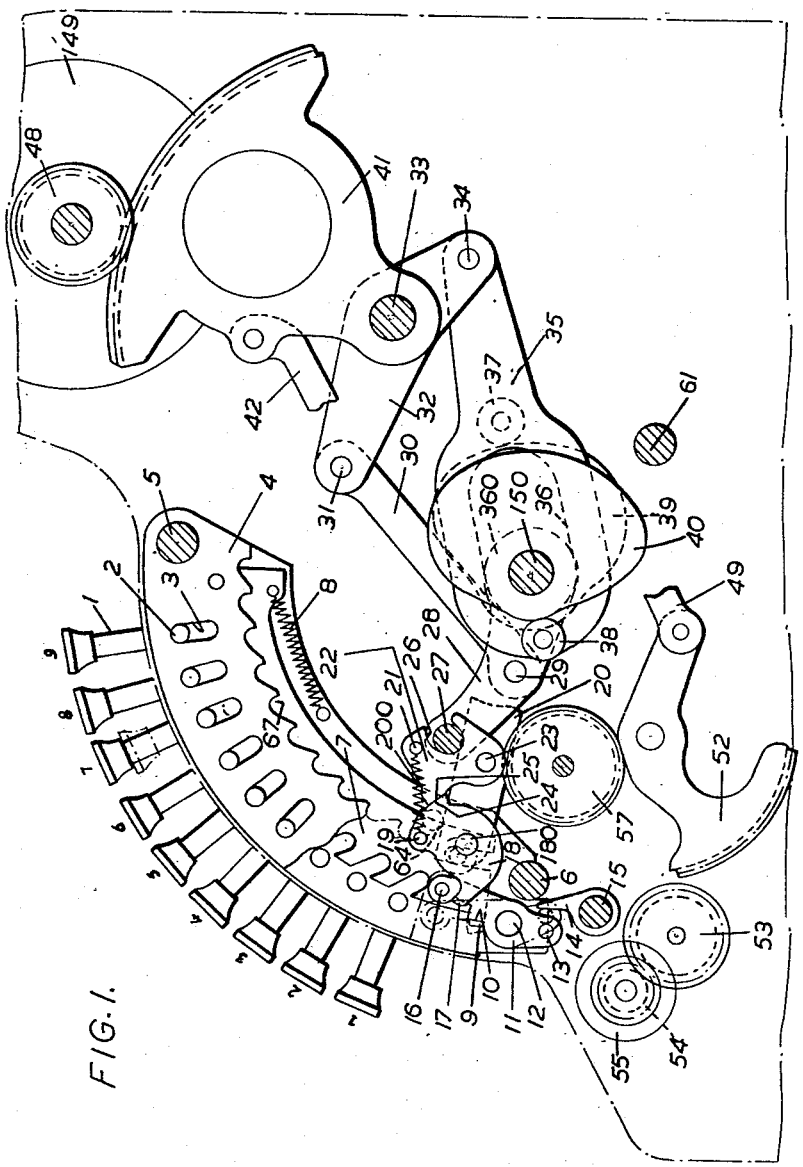
Fig. 1 is a side view taken alongside one of the banks of amount keys, showing the differential mechanism in normal or home position.

The amount keys 1 of each amount bank are mounted on a key frame in the usual manner, and the key frame is secured on cross shafts 5 and 6, extending between side frames of the machine (not shown)

Each key 1 carries a stud 2, which is guided by slots 3 in a combined guiding and aligning plate 4 forming part of the key frame.

A slide 7 (see particularly Figs. 2 and 3) is suitably supported for reciprocating movement by slots, such as 77, therein engaging studs 78 in the key frame, the slide 7 having, in its upper surface, a cam slot 79 for each of the studs 2, so that the said slide 7 is moved upwardly when any amount key 1 is depressed.

A spring 8 (Fig. 1), anchored between a stud on the slide 7 and a stud secured to the key frame, tends to maintain the slide 7 in the position shown in Fig. 1.

On the front lower end of the slide 7 is a lug 9, which cooperates, when the parts are in home position, as in Figs. 1 and 5, with a surface 10 on a zero stop 11, pivotally supported by a stud 12 secured to the key frame.

Fast on a shaft 15, extending across the bottom of the key banks, is a finger 14 adapted to cooperate with a stud 13 in the lower end of the zero stop 11 to release depressed keys. The shaft 15 is rocked at the end of each machine operation by a means hereinafter described.

The upper end of the zero stop 11 carries a stud 16, which is adapted to cooperate with a finger 17 on a latch 18 pivoted on a stud 180 on a differential arm 20 (see Figs. 2 and 3) loosely mounted on a main shaft 150 supported in the side frames of the machine.

Figure 2:
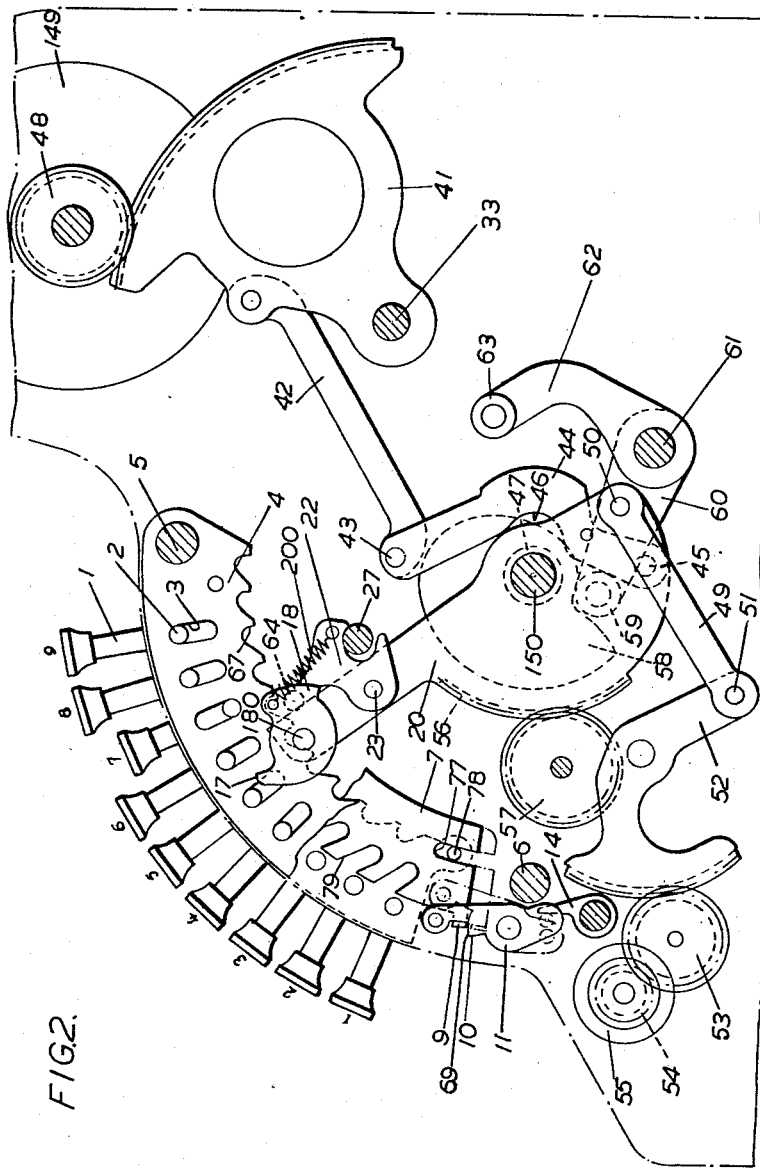
Fig. 2 shows a similar view to Fig. 1, but with the "7" amount key depressed, and with the differential mechanism in an intermediate operated position.
Figure 3:
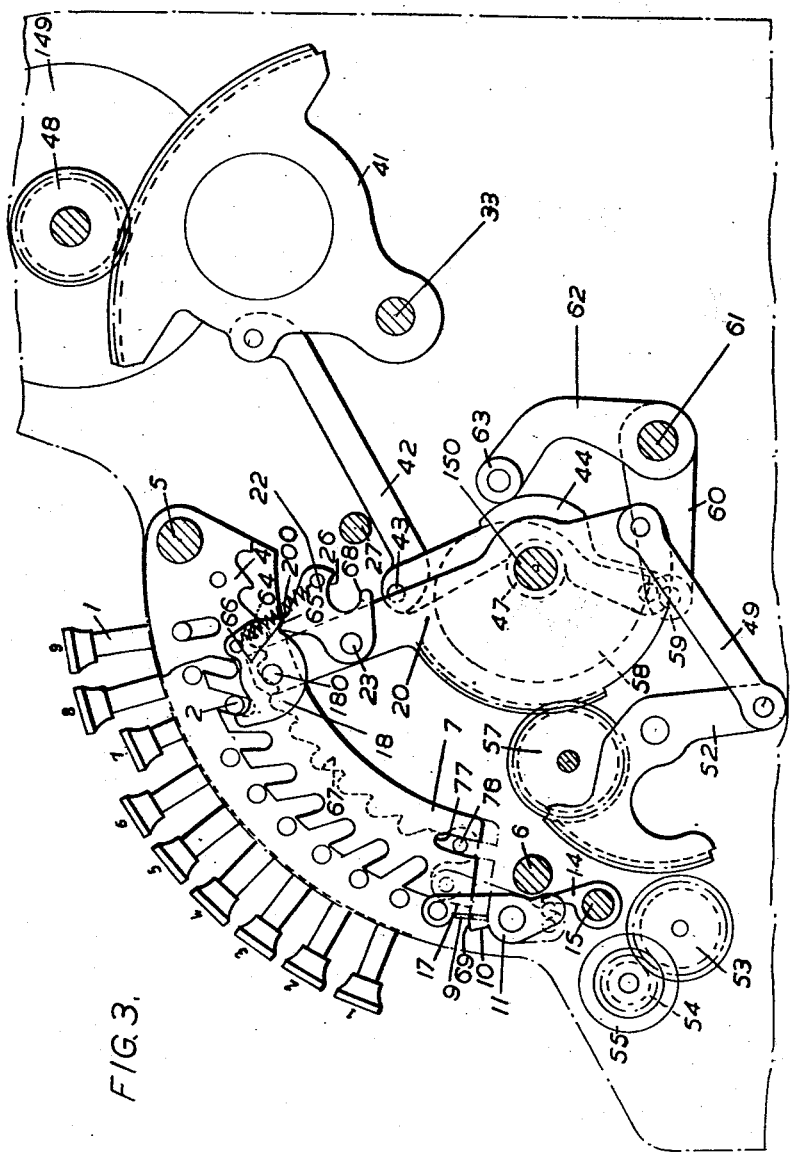
Fig. 3 shows the parts in the positions which they assume when the latch device is arrested under control of the depressed "7" key and the driving mechanism has completed its initial operating stroke.

Also pivoted on a stud 23 on the arm 20 is a coupling pawl 22. A spring 200 (see Fig. 4), connected between a stud 19 on the latch 18 and a stud 21 on the coupling pawl 22, normally maintains a surface 24 on the latch 18 in the path of movement of a surface 25 on the coupling pawl 22, as shown in Fig. 4, the clockwise movement of the latch 18 being limited by a stud 64 therein contacting the upper surface of the latch arm 20, as shown in Figs. 2 and 3.

In the home position of the parts, as shown in Fig. 1, a surface 26 on the coupling pawl 22 overlies the arcuate path of a rod 27, which is common to the coupling pawls of all the key banks and is carried by a pair of arms 28, only one of which is shown, loose on the main shaft 150 of the machine.

The main shaft 150 is adapted to be driven through one complete clockwise revolution at each machine operation, in a well-known manner, as illustrated in the above-mentioned Brietling patent, and as hereinafter described.

The arm 28 has pivotally connected thereto, at 29, one end of a link 30, the other end of which is connected to a stud 31 on one end of a beam 32 loosely supported on a shaft 33 extending between side frames of the machine. To the other end of the beam 32 is pivoted, at 34, a pitman 35, having therein an enlarged opening 36, which embraces a hub 260 on the main shaft 150.

The pitman 35 carries two rollers 37 and 38, which cooperate, respectively, with a pair of companion cams 39 and 40 fast on the shaft 150.

Loosely mounted on the shaft 33 is an indicator setting segment 41 of known construction, illustrated in the above Breitling patent, which is connected at 43 by a link 42, shown best in Fig. 2, to a beam 44 pivoted on a stud 45 in the lower end of the differential arm 20. An inner arcuate surface 46 on the beam 44 is adapted to be moved into engagement with a hub 47 on the differential arm 20.

Teeth in the segment 41 mesh with a gear 48, secured to an indicator drum 149.

Pivotally connected at 50 to the lower end of the differential arm 20 is a link 49, pivotally connected at 51 to a totalizer setting segment 52, having teeth which mesh with an intermediate gear 53, meshing, in turn, with a gear 54 secured to a totalizer wheel 55.

The forward side of the differential arm 20 carries teeth 56, which mesh with a type setting gear 57, for setting a related type wheel (not shown) in known manner, as illustrated in the above-mentioned Breitling patent.

Fast on the main shaft 150 is a cam 58 (Fig. 2), cooperating with a roller 59 on an arm 60 fast on a shaft 61 journalled in the side frames of the machine. Also fast on the shaft 61 is another arm 62, carrying a roller 63, which is adapted to engage a rear surface of the beam 44 during each machine operation.

The main shaft 150 is rotated by a hand crank 151, clutched to a gear 152 on a stud 153. The gear 152 meshes with an idler gear 154, rotatably mounted on a stud 155 on the side frame 156. The idler gear 154 meshes with a gear 157 secured to the main shaft 150. The ratio of the gears 152 to 157 is such that two complete rotations of the hand crank rotate the main shaft 150 one complete rotation.

The shaft 15 is operated when the idler gear 154 is rotated by the hand crank 151. The idler gear meshes with a pinion 158 rotating on a stud 159 on the side frame 156. The pinion 158 meshes with a gear 160 secured to a shaft 161. Secured to the side of the gear 160 is a plate 162, on which is mounted a stud 163. Also mounted on the stud 159 is a forked lever 164, bifurcated at its upper end to engage a stud 165 on an arm 166 secured to the shaft 15. A spring 167, connected to an arm 169 of the lever 164, maintains the lever 164 and the arm 166, together with the fingers 14, in normal positions, and also maintains an arm 168 of the lever 164 in the path of the stud 163.

Near the end of the machine operation, the stud 163 engages the arm 168 and rocks the lever 164 a short distance clockwise (Fig. 7), thus tensioning spring 167. Upon clockwise movement of the lever 164, the arm 166 and consequently the shaft 15 are rocked counter-clockwise. As the stud 163 passes from engagement with the arm 168, the spring 167 restores the parts to normal positions, shown in the drawings.

*Operation*

A machine operation will first be described in which an amount key 1 having the value "7" has been depressed, as shown in Figs. 2 and 3.

Depression of a key 1, such as the key having the value "7," through the cooperation of its stud 2 with the related cam slot in the slide 7, cams said slide upwardly to remove the lug 9 from the path of the surface 10 of the zero stop 11, whereupon a spring (not shown) rocks said zero stop 11 counter-clockwise to remove the stud 16 thereon from the path of the finger 17 of the latch 18. Counter-clockwise movement of the zero stop positions a locking surface 69 thereon (see Figs. 2 and 3) under the lug 9 of the slide 7, preventing return movement of the latter, so as to lock the key "7" in depressed position. The high portion of the slide between the cam slots is moved beneath the studs 2 of the unoperated keys to prevent their simultaneous depression.

The operation of the machine, either by handle or by motor, causes the main shaft 150 to rotate clockwise, as already stated, whereby the cams 39 and 40, cooperating with their related rollers 37 and 38 on the pitman 35, move said pitman to the left, as seen in Fig. 1, rocking the beam 32 clockwise, so that the link 30 rotates the driving arm 28 clockwise.

As the arm 28 rotates clockwise, the rod 27 engages with the overlying surface 26 of the coupling pawl 22. Since the coupling pawl 22 is held against rotary movement at this time by the latch 18, the differential arm 20 is rotated clockwise by the cams 38 and 39.

Fig. 2 shows the parts in the position just prior to the contact of the finger 17 of the latch 18 with the stud 2 on the depressed key "7."

The differential arm 20 continues its clockwise movement, under the influence of the driving rod 27, until the finger 17 on the latch 18 strikes the stud 2 on the depressed key "7," as shown in Fig. 3.

Further clockwise movement of the differential arm 1 will now cause the latch 18 to rock counter-clockwise on its pivot 180, tensioning the spring 200, until the surface 24 (see Fig. 4) on said latch passes beyond the surface 25 on the coupling pawl 22, whereupon the combined pressure of the rod 27 and the spring 200 causes the coupling pawl 22 to rock counter-clockwise on its pivot 23 until an abrupt surface 65 on the pawl 22 snaps under an abrupt surface 66 on the latch 18.

The counter-clockwise movement of the latch 18, when it contacts the stud 2 of the depressed key "7," causes the stud 64 to engage in a related one of a series of aligning notches 67 in the plate 4. The cooperation of the surfaces 65 and 66 causes the latch 18, and therefore the differential arm 20, to be locked in adjusted position.

The counter-clockwise movement of the coupling pawl 22 removes its surface 26 from the path of the rod 27, and the latter now continues its clockwise movement until it reaches the position shown in Fig. 3.

If the previous setting was to a lower value than the current one, the clockwise setting movement of the differential arm 20, until it has been arrested by the depressed key "7," causes the beam 44 to rock counter-clockwise on its pivot 45. The cam 58 is timed so that, after the differential arm 20 has been set under control of the depressed key "7," it cooperates with the roller 59 to rock the arms 60 and 62 counter-clockwise, whereupon the roller 63 engages the rear side of the beam 44, moving it counter-clockwise on its pivot 45, until the inner surface 46 of the beam 44 strikes against the hub 47 on the differential arm 20. Since the indicator segment 41 is coupled to the beam 44, it will be set to a position corresponding to the extent of travel of said beam, to set the indicator wheel 149, through the gear 48.

During the setting movement of the differential arm 20, the teeth 56 on its front edge, cooperating with the gear 57, set the appropriate type wheel.

If the previous setting of the differential arm 20 was to a higher value than the current setting, then, as the differential arm 20 moves clockwise, the beam 44 will pivot clockwise about the hub 47, causing the link 42 to rock the segment 41 clockwise, to move the indicator drum 149 to the "7" position.

After the differential arm 20, the indicator wheel 149, and the type setting gear 47 have been set, as above described, continued clockwise movement of the main shaft 150 permits the arms 60 and 62 to be restored clockwise, by a spring (not shown), to their original positions, as the roller 59 follows the contour of the cam 58.

During the said continued movement of the main shaft 150, the cams 39 and 40 (Fig. 1) restore the pitman 35 to the right, to the position shown in this figure, the rod 27 thereby being moved counter-clockwise. During this counter-clockwise movement of the rod 27 (Fig. 3), it contacts a lower surface 68 on the coupling pawl 22, but, at this time, the latch 18 is still locked against any clockwise movement by its engagement with the stud 2. However, continued movement of the rod 27 causes the differential arm 20 to commence a counter-clockwise restoring movement, removing the latch 18 from the restraint of the stud 2. Immediately thereafter, pressure of the rod 27 on the surface 68 of the coupling pawl 22 rocks the latter clockwise, moving the abrupt surface 65 thereon out of engagement with the abrupt surface 66 on the latch 18 and tensioning the spring 200. As soon as the said abrupt surfaces leave one another, the latch 18, which, as just mentioned, is now freed from the stud 2, is rocked clockwise by the spring 200 to the position shown in Fig. 1, whereupon the surface 24 again interlocks with the surface 25 on the coupling pawl 22. Continued counter-clockwise movement of the rod 27 now restores the differential arm 20 to its home position, as shown in this figure.

During the restoring movement of the differential arm 20, the beam 44 pivots idly counter-clockwise on the stud 43, leaving the indicator wheel 149 in the position in which it has been set.

Near the end of the cycle of machine operation, the stud 163, engaging the lever 164, rocks said lever and the arm 166, to rock connection to the shaft 15 first counter-clockwise and then clockwise (Fig. 7). Upon the counter-clockwise movement of the shaft 15, the finger 14 is similarly moved, rocking the zero stop 11 clockwise to home position, removing the surface 69 (Fig. 2) thereon from the path of the lug 9 on the slide 7, releasing the latter to the action of the spring 8 (Fig. 1), which restores the slide downwardly to home position, and releasing the depressed key "7" so that it will be restored upwardly by the usual spring (not shown).

As the slide 7 moves downwardly, the lug 9 thereon is positioned in front of the surface 10 on the zero stop 11. Upon the return clockwise movement of the finger 14, it is removed from contact with the stud 13 in the zero stop 11, whereupon the latter is rocked slightly counter-clockwise by its spring until the surface 10 on the zero stop 11 contacts the lug 9 on the slide 7, to maintain said zero pawl in its normal home position, as shown in Fig. 1.

Just prior to the clockwise movement of the rod 27, the intermediate gear 53 and the totalizer wheel 55 are rocked in the manner shown in the above-mentioned Breitling patent, so that the former engages with the toothed segment 52, whereby, during the clockwise movement of the differential arm 20, the setting of the segment by the link 49 will transmit an amount corresponding to the operated amount key 1 to the totalizer wheel 55.

If none of the keys 1 has been depressed, the zero stop 11 will remain in the position shown in Fig. 1, so that, when the differential arm 20 commences its clockwise movement, the stud 16 on the zero stop 11 will engage the finger 17 on the latch 18, causing the latter to be rocked counter-clockwise, whereupon the coupling pawl 22 will be disengaged from the driving rod 27, the remainder of the machine operation then continuing exactly as described above, to position the indicator wheel 149, the type setting gear 57, and the totalizer wheel 55 at zero.

While the form of mechanism shown and described herein is admirably adapted to fulfill the object primarily stated, it is to be understood that it is not intended to confine the invention to the form or embodiment disclosed herein, for it is susceptible of embodiment in various other forms.

What is claimed is:

1. In a machine of the class described, the combination of a plurality of settable keys, a zero stop pawl, a differentially settable arm, a driving means for the arm, a latch member pivoted on said arm, a finger on the latch member cooperating either with a set key or with the zero stop pawl whereby the latch member is rocked on its pivot, a coupling member pivoted on said arm, a spring connecting the latch pawl and the coupling member, an arcuate surface on the coupling member normally engaged by the driving means, and a locking surface on the latch pawl normally held in engagement with the coupling pawl by said spring to hold the coupling member in engagement with the driving means, whereby the driving means actuates the said arm.

2. In a machine of the class described, the combination of a plurality of settable keys; a zero stop pawl; a differentially settable arm; a driving means for the arm; a latch member pivoted on said arm; a finger on the latch member cooperating either with a set key or with the zero stop pawl whereby the latch member is rocked on its pivot; a coupling member pivoted on said arm; a spring connecting the latch pawl and the coupling member; an arcuate surface on the coupling member normally engaged by the driving means; a locking surface on the latch pawl normally held in engagement with the coupling pawl by said spring to hold the coupling member in engagement with the driving means, whereby the driving means actuates the said arm; a second locking surface on the latch member; a locking surface on the coupling member, said locking surface on the coupling member movable by the spring into contact with the locking surface on the latch member when the latch member is rocked by engagement of said finger thereon with a set key or the zero stop pawl to lock the coupling member in moved position, wherein the arcuate surface is out of engagement with the driving means; a plate having a plurality of locking notches; and means on the latch member engaging a notch when in moved position to lock the latch member in a set position commensurate with the key which has been engaged by said finger.

3. In a machine of the class described, the combination of a plurality of settable keys; a zero stop pawl; a differentially settable arm; a driving means for the arm; a latch member pivoted on said arm; a finger on the latch member cooperating either with a set key or with the zero stop pawl whereby the latch member is rocked on its pivot; a coupling member pivoted on said arm; a spring connecting the latch pawl and the coupling member; an arcuate surface on the coupling member normally engaged by the driving means; a locking surface on the latch pawl normally held in engagement with the coupling pawl by said spring to hold the coupling member in engagement with the driving means, whereby the driving means actuates the said arm; a second locking surface on the latch member; a locking surface on the coupling member, said locking surface on the coupling member movable by the spring into contact with the locking surface on the latch member when the latch member is rocked by engagement of said finger thereon with a set key or the zero stop pawl to lock the coupling member in moved position, wherein the arcuate surface is out of engagement with the driving means; a plate having a plurality of locking notches; means on the latch member engaging a notch when in moved position to lock the latch member in a set position commensurate with the key which has been engaged by said finger; and a second arcuate surface on the coupling member engageable by the driving means when the latter is moved in return direction to rock the locking surface of the coupling member out of engagement with the locking surface on the latch member, whereupon the spring returns the latch member into position wherein the first-named locking surface of the latch member moves into position to maintain the coupling member in said normal position, wherein the coupling pawl is held in engagement with the driving means.

4. In a machine of the class described, the combination of a plurality of settable keys; a zero stop pawl; a differentially settable arm; a driving means; a pair of interacting members pivotally mounted on the arm, one of said members normally locking the other one of said members in engagement with the driving means; a projection on one of said members movable into engagement with an operated one of said keys or the zero stop pawl, to cause relative movement between said members and thereby to cause the other one of said members to be disconnected from the driving means and to lock the said one member in the position to which it is adjusted under control of an operated key or the zero stop, said zero stop pawl normally held in position to be engaged by said projection; a key detent movable upon depression of a key, said detent normally engaging the zero stop pawl to maintain the zero stop pawl in normal position; a locking surface on the zero stop pawl, said detent movable out of engagement with the zero stop pawl by the depression of a key to release the zero stop pawl for movement out of the path of movement of said projection, said locking surface thereupon movable into engagement with the detent to maintain the detent in moved position and thereby maintain the depressed key in depressed position; and cam slots in the detent coacting with the keys to maintain the keys in depressed position when the detent is locked in moved position by the zero stop pawl.

5. In a machine of the class described, the combination of a plurality of settable keys; a zero stop pawl; a differentially settable arm; a driving means; a pair of interacting members pivotally mounted on the arm, one of said members normally locking the other one of said members in engagement with the driving means; a projection on one of said members movable into engagement with an operated one of said keys or the zero stop pawl, to cause relative movement between said members and thereby to cause the other one of said members to be disconnected from the driving means and to lock the said one member in the position to which it is adjusted under control of an operated key or the zero stop, said zero stop pawl normally held in position to be engaged by said projection; a key detent movable upon depression of a key, said detent normally engaging the zero stop pawl to maintain the zero stop pawl in normal position; a locking surface on the zero stop pawl, said detent movable out of engagement with the zero stop pawl by the depression of a key to release the zero stop pawl for movement out of the path of movement of said projection, said locking surface thereupon movable into engagement with the detent to maintain the detent in moved position and thereby maintain the depressed key in depressed position; cam slots in the detent coacting with the keys to maintain the keys in depressed position when the detent is locked in moved position by the zero stop pawl; a rock shaft; a finger on the rock shaft engageable with the zero stop pawl; and means to actuate the rock shaft during each machine operation to engage the finger with the zero stop pawl to restore the zero stop pawl to normal position and thereby release the detent and the depressed key.

KARL HEINRICH TENOORT.

References Cited in the file of this patent

UNITED STATES PATENTS

| Number | Name | Date |
|---|---|---|
| 875,075 | Heinitz | Dec. 31, 1907 |
| 1,529,955 | Kolbe | Mar. 17, 1925 |
| 2,008,877 | Robertson | July 23, 1935 |
| 2,108,476 | Dahlberg | Feb. 15, 1938 |
| 2,176,561 | Placke | Oct. 17, 1939 |
| 2,241,987 | Eickman | May 13, 1941 |
| 2,281,803 | Robertson | May 5, 1942 |

FOREIGN PATENTS

| Number | Country | Date |
|---|---|---|
| 191,346 | Great Britain | Jan. 4, 1923 |
| 441,876 | Great Britain | Jan. 27, 1936 |